No. 880,885. PATENTED MAR. 3, 1908.
W. M. HENSON.
KITCHEN CABINET.
APPLICATION FILED AUG. 16, 1907.
2 SHEETS—SHEET 1.
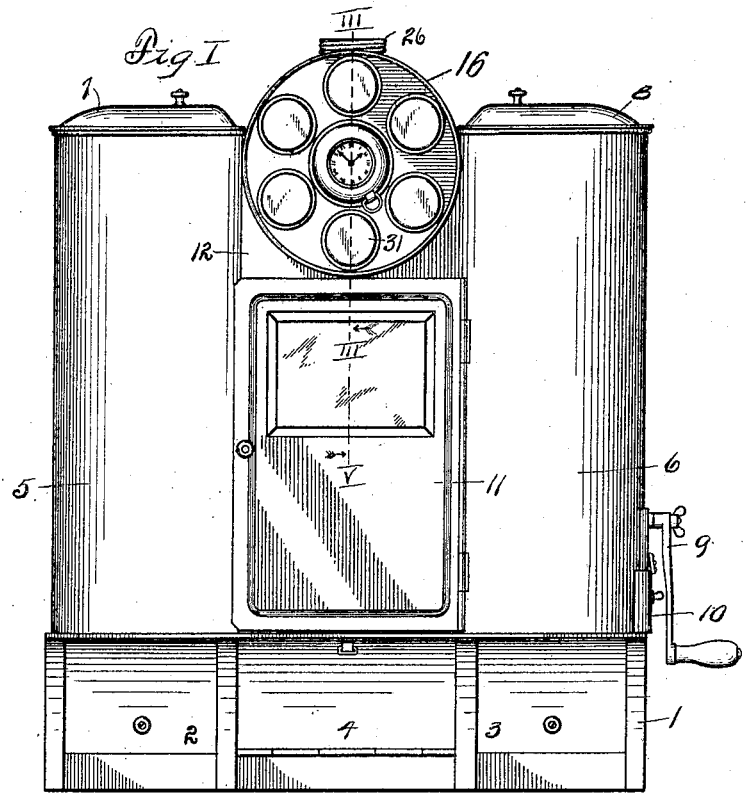
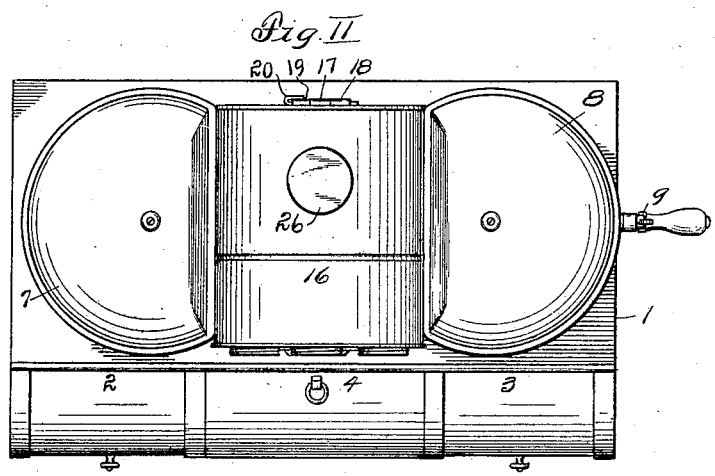
WITNESSES:
R. E. Hamilton
A. M. Maxwell
INVENTOR.
Wm. M. Henson:
BY Arthur C. Brown,
ATTORNEY.

No. 880,885. PATENTED MAR. 3, 1908.
W. M. HENSON.
KITCHEN CABINET.
APPLICATION FILED AUG. 16, 1907.
2 SHEETS—SHEET 2.
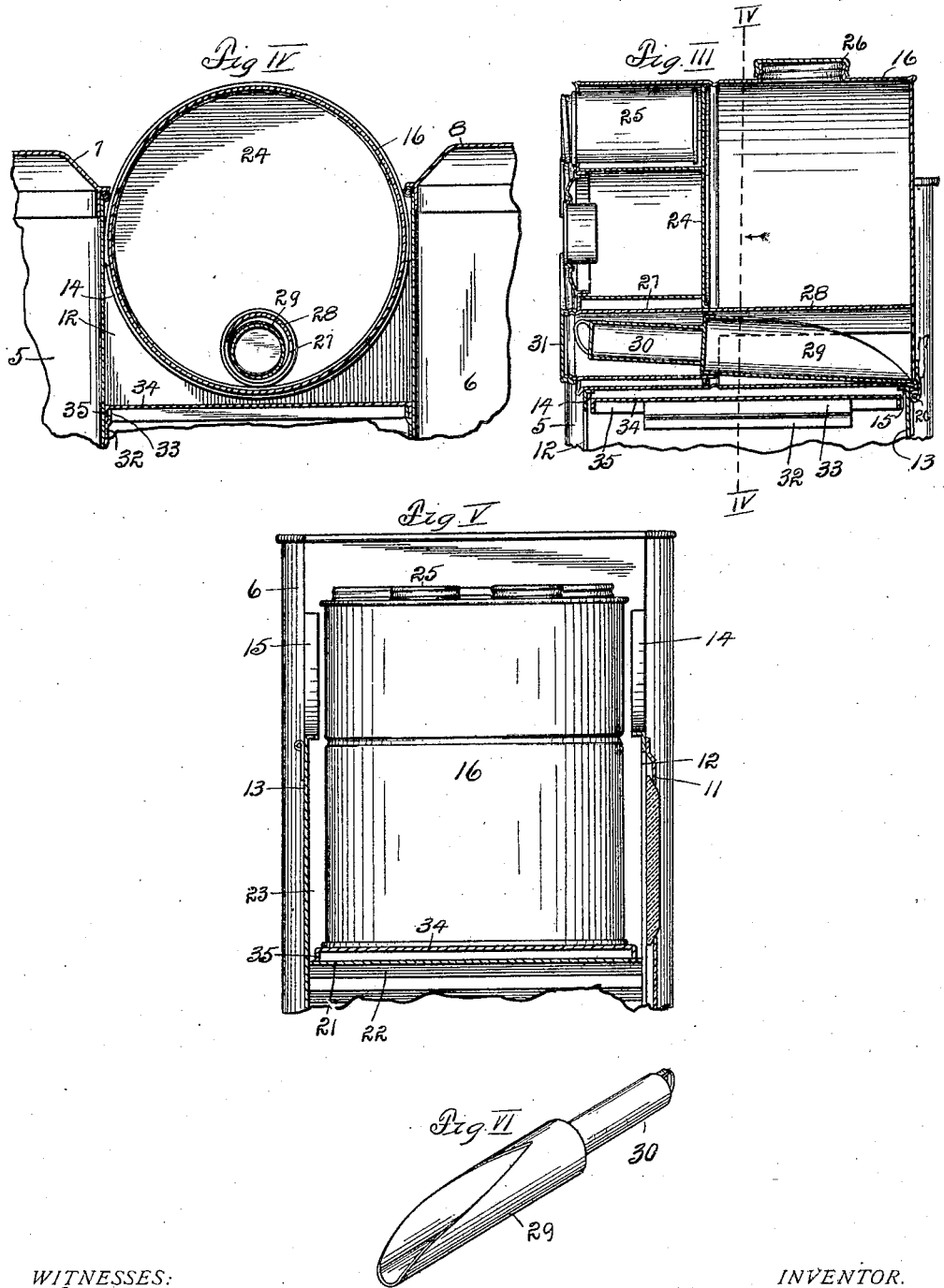
WITNESSES:
R. E. Hamilton
A. M. Maxwell
INVENTOR.
Wm. M. Henson:
BY
Arthur E. Brown
ATTORNEY.

UNITED STATES PATENT OFFICE.

WILLIAM M. HENSON, OF KANSAS CITY, MISSOURI.

KITCHEN-CABINET.

No. 880,885.                Specification of Letters Patent.        Patented March 3, 1908.

Application filed August 16, 1907. Serial No. 388,762.

*To all whom it may concern:*

Be it known that I, WILLIAM M. HENSON, a citizen of the United States, residing at Kansas City, in the county of Jackson and State of Missouri, have invented certain new and useful Improvements in Kitchen-Cabinets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a kitchen cabinet, and has for its object to provide a device of that class which is simple and economical in construction, neat in appearance, and conveniently arranged for storing a variety of products; the present invention being an improvement over the cabinet shown in the Letters-Patent No. 811,918, granted to me February 6, 1906, and relating particularly to the portion of the cabinet containing the spice bin drum, and to the peculiar construction of said drum.

In the accompanying drawings forming part of this specification:—Figure I is a view in front elevation of a cabinet constructed according to my invention. Fig. II is a top plan view of same. Fig. III is a central longitudinal sectional view of the spice bin drum on the line III—III, Fig. II. Fig. IV is a transverse sectional view on the line IV—IV, Fig. III. Fig. V is a view of the upper portion of the cabinet, on the line III—III—V, Fig. I showing the spice bin drum in its shipping position. Fig. VI is an enlarged detail view of the scoop shown in section in Fig. III.

Referring more in detail to the drawings 1 designates the cabinet base which has a flaring front provided with sliding doors 2 and 3, and with a central hinged door 4, covering the base bins which extend backwardly therefrom; and are adapted for containing bread, cake, etc. Supported on base 1, above said bins is a body portion comprising the vertical side bins 5 and 6, which are preferably rounded at their outer sides and adapted for containing flour, meal, etc. Bins 5 and 6 are provided with the covers 7 and 8, and one of them is shown to be provided with suitable sifter, the crank 9 of which is visible, and with a removable scoop 10 below said sifter. Between bins 5 and 6 is a central chamber which may be suitably divided and provided with a door 11, and with the front and back plates 12 and 13.

Supported on arcuatile straps 14 and 15, carried on the front and back plates 12 and 13, is a spice bin drum 16, which drum is removably seated on said straps and is provided with a perforated lug 17 at the back. On the back plate 13 are lugs 18 and 19, having perforations adapted to register with the perforations in lug 17, when the drum is in place, and 20 is a pin which extends through the perforations in said lugs, for the purpose of anchoring said drum in its seat.

Secured to the inner side of each of bins 5 and 6 is a bracket 32, having a flange 33, and supported on said brackets is a shelf 34 having down turned edges 35, adapted to fit between flange 33 and the sides of the bin, so that said shelf may be anchored on the bracket, and may be easily removed therefrom, when desired.

Within the central chamber at a convenient distance below the top of the bins 5 and 6, is a permanent shelf 21, dividing said chamber into a lower shelf containing chamber 22 and an upper chamber 23, within which the drum 16 may be posited when the cabinet is being shipped. Drum 16 is provided with a transverse diaphragm 24, and the chamber forward of this diaphragm is subdivided into compartments adapted to contain canisters 25, while the chamber to the rear, is undivided and provided with a top opening having a cap 26. Projecting through diaphragm 24 and through the front of the drum, is a cylinder 27, the lower portion of which is cut away within the compartment in the rear of the diaphragm, to form a shield 28 for the scoop 29, the body of which rests within said compartment and is provided with a handle portion 30, projecting forwardly into the cylinder 27. On the front of and closing cylinder 27, is a cap 31 which may be identical in appearance and construction as the caps on canisters 25.

When in use, the parts are assembled as illustrated in Fig. 1, with the drum 16 seated on straps 14 and 15, and anchored at the back by means of the pin and lug mechanism. The bins may be filled with the material desired, in the same manner as described in my previous patent, these parts being substantially the same, with the exception of that in the rear portion of the drum 16, which is especially adapted for the reception of sugar, salt, or like granular material. In the use of this compartment, the material is poured in through the top opening, and contacts with the shield 28 projecting through its center, and passes over the sides to the bottom of the drum, without falling directly upon the scoop 29, but passing around the shield and into the protected portion from the sides. When it is desired to withdraw the material, the front cap is removed and the scoop partially withdrawn to allow the material to pass into the space previously occupied by it, when by inserting the scoop it may be easily filled without the necessity of forcing it into the body of material.

To avoid injury to the drum 16, when shipping, that part is removed from its seat on straps 15, the shelf 34 lifted from its seat on brackets 32, and posited on the permanent shelf 21 between the vertical bins 5 and 6, and the drum set on end on said shelf, within the enlarged chamber formed thereby. When in this position the cabinet may be securely packed and shipped, without injury to the ordinarily protruding upper portion of the drum or to the caps projecting from the drum end.

As before stated, the parts of the present cabinet not specifically mentioned, are fully described in my previous patent, to which reference may be made for their detailed description.

Having thus described my invention, what I claim as new therein and desire to secure by Letters-Patent is—

1. In a kitchen cabinet, the combination with a base portion, of bins mounted thereon, and separated to form an intermediate chamber, plates extending between said bins and inclosing said chamber at the front and back, a drum removably mounted on said plates and normally covering said chamber, and a shelf in said chamber, upon which said drum may be supported when nested therein as set forth.

2. In a kitchen cabinet, the combination with a base and body portion, of a drum and a cylinder mounted in said drum, having a portion of its lower side cut away and one end opening through the drum end, substantially as set forth.

3. In a kitchen cabinet, a body portion having a central chamber, brackets on said body portion projecting into said chamber, a shelf mounted on said brackets, and a drum removably mounted on said body portion over said chamber, said shelf being adapted for removal from its brackets, and said drum being adapted for removal from its seat, and for nesting wholly within said chamber, substantially as set forth.

4. In a kitchen cabinet, the combination of a base and bins mounted thereon, in a manner to form a chamber therebetween, plates inclosing said chamber at the front and back arcuatile straps on the top of the front and back plates, a drum seated on said straps, and latch members on said drum and on one of said plates.

5. In a kitchen cabinet a drum, and a cylinder mounted in said drum near the bottom, and having its lower side cut away for a portion of its extent, for the purpose set forth.

6. In a kitchen cabinet, a drum, and a cylinder opening through one end of said drum and extending longitudinally therein, and having its lower portion cut away at the end opposite the drum opening, substantially as set forth.

7. In a kitchen cabinet, a cylindrical drum having a transverse diaphragm dividing the interior into chambers, and a peripheral opening affording an inlet to one of said chambers, a cylinder extending through the second chamber and through the diaphragm and front of the drum, and a shield portion extending backwardly from the upper portion of the cylinder through said first chamber, for the purpose set forth.

In testimony whereof I affix my signature in presence of two witnesses.

WILLIAM M. HENSON.

Witnesses:
JAMES H. RICHARDSON,
MYRTLE RUSSELL.